United States Patent Office 3,524,873
Patented Aug. 18, 1970

3,524,873
PROCESS FOR PRODUCING α-ALKYLACRYLONITRILE
Naoya Kominami, Tokyo, Hitoshi Nakajima, Urawa-shi, and Masazumi Chono, Kitaadachi-gun, Japan, assignors to Asahi Kasei Kogyo Kabushiki Kaisha, Osaka, Japan
No Drawing. Filed Dec. 20, 1967, Ser. No. 691,924
Claims priority, application Japan, Dec. 27, 1966, 42/84,729
Int. Cl. C07c 121/32
U.S. Cl. 260—465.9      2 Claims

ABSTRACT OF THE DISCLOSURE

Process for the production of α-alkylacrylonitriles, comprising heating a cyano-terminated alkene (i.e. β-methylacrylonitrile, β-ethylacrylonitrile or allylnitrile) at a temperature of from 300 to 600° C. in the presence of at least one oxide, hydroxide, nitrate, carbonate or lower carboxylate of magnesium, aluminum, lithium, sodium, potassium, rubidium or cesium as catalyst alone or together with at least one alkali metal halide.

---

This invention relates to a process for the production of α-alkylacrylonitriles by an isomerization reaction of a cyano-terminated alkene in the presence of a catalyst at an elevated temperature.

Process hitherto proposed for producing α-alkylacrylonitriles included a process for producing α-methylacrylonitrile (=methacrylonitrile) by ammonoxidation of isobutylene; and a process for producing α-methylacrylonitrile or α-ethylacrylonitrile by oxycyanation of propylene or normal butene. The former disadvantageously uses isobutylene of high cost as a starting material and the latter by-produces cyano-terminated alkenes such as crotononitrile and allylnitrile in case of using propylene as a starting material. Cyano-terminated nitriles such as crotononitrile and allylnitrile are low in polymerizability excepting acrylonitrile, while α-alkylacrylonitriles are high in polymerizability.

As to the isomerization of cyanoalkenes, it is also known that the cis-form is converted into the trans-form by stereo-isomerization and allylnitrile is isomerized into crotononitrile by transferring the carbon-carbon double bond (Can. J. Chem. 41, 2748, 1963; Shokubai I, 3. 1965).

According to the present invention there is provided a process for producing α-alkylacrylonitriles which comprises heating a cyano-terminated alkene at an elevated temperature in the presence of at least one compound of magnesium, aluminum or alkali metals as catalyst.

The temperature adopted in the present invention is in the range of from 300° to 600° C., preferably from 400° to 500° C. At temperatures above 600° C. the selectivity is reduced, the reactants or α-alkylacrylonitriles being decomposed, whereas below 300° C., the yield of the α-alkylnitriles in a one pass is remarkably reduced.

The cyano-terminated alkenes which can be used in the process of the present invention are β-methylacrylonitrile (=crotononitrile), β-ethylacrylonitrile and allylnitrile. The products of the process are α-methylacrylonitrile (=methacrylonitrile) in the case of using β-methylacrylonitrile or allylnitrile as a starting material; and α-ethylacrylonitrile in the case of using β-ethylacrylonitrile as a starting material.

Examples of compound of magnesium, aluminum or alkali metals which may be used in the process of this invention are oxides, hydroxides, carbonates, nitrates, halides such as chloride, bromide or iodide and carboxylates such as acetate.

Examples of alkali metals are lithium, sodium, potassium, rubidium and cesium.

The catalyst is preferably used in the form of combination. For example, a combination of the compounds of magnesium with these of alkali metals greatly increases the yields of α-alkylacrylonitriles. In such a case, the atomic ratio of magnesium metal to alkali metal is preferably in the range of from 1:10 to 5:1.

When alkali metal halides such as sodium or potassium chloride, bromide or iodide are used as promoter, it has been found that the formation of by-products may be suppressed and the selectivity of α-alkylacrylonitriles may be increased. These effects are particularly prominent where the compounds of aluminum are to be used as catalyst. In such a case, the atomic ratios of aluminum metal to alkali metal in the alkali metal halides are preferably in the range of from 10:1 to 1:5.

The catalyst may be prepared by any of the conventional methods such as immersion, mixing, heating, precipitating or gelling.

The use of a carrier is not essential but preferable. In the case of using the compounds of magnesium or alkali metals as catalyst, silica gel and active carbon are preferred. The use of silica gel tends to increase the catalyst life. Silica gel may form partially or completely a compound such as silicate together with the catalyst.

The process of the present invention may be carried out at atmospheric pressure, under superatmospheric pressure or under reduced pressure as far as a vapor phase reaction is maintained under the reaction conditions.

The starting materials may be diluted with an inert gas such as nitrogen, helium and carbon dioxide but this is not essential.

The space velocity to be adopted in the process of this invention (flowing volume of gaseous starting materials calculated as in normal state/volume of catalyst) is preferably in the range of from 20 to 20,000 hr.$^{-1}$.

This invention will be illustrated by the following examples which are in no way limiting upon the scope hereof. Percentages are by mole unless expressly stated to the contrary.

EXAMPLE 1

5 g. of magnesium oxide is diluted with 10 g. (=10 ml.) of quartz sand and this mixture was filled into a reaction tube of quartz glass and the reaction tube was placed in an alumina fluidized bath maintained at 400° C. Into the reaction tube a gas mixture consisting of crotononitrile and nitrogen at a volume ratio of 1:3 was introduced at a space velocity of 960 hr.$^{-1}$. Over 30 minutes after the starting of reaction, conversion of crotononitrile was 19.5% and one pass yield of methacrylonitrile was 11.2%. Some production of acetonitrile as by-product was observed.

EXAMPLE 2

1.5 g. of aluminum oxide was filled into a reaction tube in the same manner as in Example 1 and a gas mixture consisting of crotononitrile and nitrogen at a volume ratio of 1:3 was introduced into the reaction tube maintained at 450° C. at a space velocity of 960 hr.$^{-1}$. Over 15 minutes after the starting of reaction, conversion of crotononitrile was 40.8% and one pass yield of methacrylonitrile was 15.4%.

EXAMPLE 3

2.7 g. of magnesium carbonate was filled into a reaction tube in the same manner as in Example 1 and a gas mixture consisting of crotononitrile and nitrogen at a volume ratio of 1:3 was introduced into the reaction tube maintained at 400° C. at a spaced velocity of 960 hr.$^{-1}$. Over 30 minutes after the starting of reaction, conversion of crotononitrile was 48.5% and one pass yield of methacrylonitrile was 20.5%.

EXAMPLE 4

2.7 g. of magnesium carbonate was filled into a reaction tube and a gas mixture consisting of β-ethylacrylonitrile and nitrogen at a volume ratio of 1:3 was introduced into the reaction tube in the same manner as in Example 3. Over 30 minutes after the starting of reaction, conversion of β-ethylacrylonitrile was 38.5% and one pass yield of α-ethylacrylonitrile was 12.3%.

EXAMPLE 5

To an aqueous solution containing 5.15 g. of magnesium, 50 g. (=100 ml.) of silica gel was added, and the mixture was evaporated to dryness on a hot water bath and subsequently heated at 500° C. in a stream of nitrogen. 6 ml. of this catalyst was filled into a reaction tube and a gas mixture consisting of crotononitrile and nitrogen at a volume ratio of 1:3 was introduced into the reaction tube maintained at 500° C. at a space velocity of 900 hr.$^{-1}$. Over 30 minutes after the starting of reaction, conversion of crotononitrile was 26.2% and one pass yield of methacrylonitrile was 11.8%. Over 4 hours after the starting of reaction, none of lowering in the conversion and the one pass yield was observed.

EXAMPLE 6

15 g. of aluminium oxide were each added to 100 ml. of aqueous solution containing 0.6 g. of sodium chloride, to 100 ml. of aqueous solution containing 1.0 g. of sodium bromide and to 100 ml. of aqueous solution containing 0.7 g. of potassium chloride and the mixtures were each evaporated to dryness on a hot water bath. 5 ml. of these catalysts were each filled into a reaction tube and a gas mixture consisting of crotononitrile and nitrogen at a volume ratio of 1:3 was introduced into each of the reaction tubes maintained at 400° C. at a space velocity of 960 hr.$^{-1}$ in the same manner as in Example 1. The results over 40 minutes after the starting of reaction are shown in Table I.

TABLE I

| Catalyst | Conversion of crotononitrile, percent | One pass yield of methacrylonitrile, percent |
| --- | --- | --- |
| $Al_2O_3$-NaCl | 22.8 | 11.7 |
| $Al_2O_3$-NaBr | 23.8 | 10.8 |
| $Al_2O_3$-KCl | 21.2 | 10.2 |

Selectivity of methacrylonitrile in each case was increased as compared with that in case of using aluminium oxide alone as catalyst.

EXAMPLE 7

Using 6 ml. of the same magnesium oxide-silica gel catalyst as in Example 5, a gas mixture consisting of β-ethylacrylonitrile and nitrogen at a volume ratio of 1:3 was introduced into a reaction tube in the same manner as in Example 5. Over 30 minutes after the reaction, conversion of β-ethylacrylonitrile was 23.5% and one pass yield of α-ethylacrylonitrile was 10.3%.

EXAMPLE 8

Sodium hydroxide was heated at 400° C. in a stream of nitrogen. 5 g. of this catalyst was diluted with 10 g. (10 ml.) of quartz sand, and the mixture was filled into a reaction tube of quartz sand and the reaction tube was placed in an alumina fluidized bath maintained at 400° C. A gas mixture consisting of crotononitrile and nitrogen at a volume ratio of 1:3 was introduced into the reaction tube. Over 30 minutes after the starting of reaction, conversion of crotononitrile was 13.5% and one pass yield of methacrylonitrile was 7.8%.

EXAMPLE 9

To an aqueous solution containing 0.4 g. of sodium hydroxide, 50 g. (=100 ml.) of silica gel was added, and the mixture was evaporated to dryness on a hot water bath and subsequently heated at 400° C. in a stream of nitrogen. 5 ml. of this catalyst was filled into a reaction tube and a gas mixture consisting of crotononitrile and nitrogen at a volume ratio of 1:3 was introduced into the reaction tube maintained at 400° C. at a space velocity of 820 hr.$^{-1}$. Over one hour after the starting of reaction, conversion of crotononitrile was 29.0% and one pass yield of methacrylonitrile was 21.8%. Over 4 hours after the starting of reaction, none of lowering in the conversion and the one pass yield was observed.

EXAMPLE 10

Using 5 ml. of the same sodium oxide-silica gel catalyst as in Example 9, a gas mixture consisting of β-ethylacrylonitrile and nitrogen at a volume ratio of 1:3 was passed into a reaction tube maintained at 450° C. at a space velocity of 820 hr.$^{-1}$. Over one hour after the starting of reaction, conversion of β-ethylacrylonitrile was 23.5% and one pass yield of α-ethylacrylonitrile was 15.5%.

EXAMPLE 11

To an aqueous solution containing 1.06 g. of sodium carbonate, 50 g. (=100 ml.) of silica gel was added, and the mixture was evaporated to dryness on a hot water bath and subsequently heated at 500° C. in a stream of nitrogen. This catalyst was added to an aqueous solution containing 0.8 g. of magnesium carbonate, and the mixture was evaporated to dryness on a hot water bath. 5 ml. of the resulting catalyst was filled into a reaction tube and the reaction tube maintained at 400° C. and a gas mixture consisting of crotononitrile and nitrogen gas at a volume ratio of 1:3 was passed through at a space velocity of 820 hr.$^{-1}$. Over 30 minutes after the starting of reaction, conversion of crotononitrile was 30.5% and one pass yield of methacrylonitrile was 19.8%.

EXAMPLE 12

Using 5 ml. of the same sodium carbonate-magnesium carbonate-silica gel catalyst as in Example 11, a gas mixture consisting or crotononitrile and nitrogen at a volume ratio of 1:3 was introduced into a reaction tube maintained at 400° C. at a space velocity of 820 hr.$^{-1}$. Over 30 minutes after the starting of reaction, conversion of crotononitrile was 38.5% and one pass yield of methacrylonitrile was 28.8%.

EXAMPLE 13

Sodium hydroxide was heated at 400° C. in a stream of nitrogen and 0.6 g. of the resulting sodium oxide was supported on 50 g. (= 100 ml.) of active carbon by the conventional immersion process. 5 ml. of this catalyst was filled into a reaction tube and a gas mixture consisting of crotononitrile and nitrogen at a volume ratio of 1:3 was introduced into the reaction tube maintained at 430° C. at a space velocity of 820 hr.$^{-1}$. Over 30 minutes after the starting of reaction, conversion of crotononitrile was 26.8% and one pass yield of methacrylonitrile was 15.2%.

EXAMPLE 14

0.01 gram-mole of potassium hydroxide, rubidium hydroxide, cesium hydroxide and lithium hydroxide were each supported on 50 g. (=100 ml.) of silica gel in the same manner as in Example 9. 5 ml. of these catalysts were each filled into a reaction tube and a gas mixture consisting of crotononitrile and nitrogen at a volume ratio of 1:3 was introduced into each of the reaction tubes at a space velocity of 820 hr.$^{-1}$. The results over 30 minutes after the starting of reaction are shown in Table II.

TABLE II

| Catalyst | Reaction temperature, °C. | Conversion of crotononitrile, percent | One pass yield of methacrylonitrile, percent |
|---|---|---|---|
| $K_2O-SiO_2$ | 400 | 26.8 | 13.8 |
| $Rb_2O-SiO_2$ | 430 | 30.5 | 18.5 |
| $Cs_2O-SiO_2$ | 470 | 32.5 | 18.8 |
| $Li_2O-SiO_2$ | 400 | 23.6 | 12.8 |

EXAMPLE 15

Using 5 ml. of the same sodium oxide-silica gel catalyst as in Example 9, a gas mixture consisting of allylnitrile and nitrogen at a volume ratio of 1:3 was introduced into a reaction tube maintained at 400° C. at a space velocity of 820 hr.$^{-1}$. Over one hour after the starting of reaction, conversion of allylnitrile was 26.5% and one pass yield of methacrylonitrile was 18.5%.

EXAMPLE 16

To an aqueous solution containing 4.8 g. of magnesium nitrate and 1.2 g. of sodium chloride, 50 g. (= 100 ml.) of silica gel was added, and the mixture was evaporated to dryness on a hot water bath and subsequently heated at 500° C. in a stream of nitrogen for 3 hours. 3.2 g. (=6 ml.) of this catalyst was filled into a reaction tube and the reaction tube was maintained at 500° C. and a gas mixture consisting of crotononitrile and nitrogen at a volume ratio of 1:3 was introduced at a space velocity of 900 hr.$^{-1}$. Over one hour after the starting of reaction, conversion of crotononitrile was 15.8% and one pass yield of methacrylonitrile was 7.8%.

EXAMPLE 17

To an aqueous solution containing 0.01 gram-mole of sodium nitrate, 50 g. (=100 ml.) of silica gel was added, and the mixture was evaporated to dryness on a hot water bath. 5 ml. of this catalyst was filled into a reaction tube and a gas mixture consisting of crotononitrile and nitrogen at a volume ratio of 1:3 was introduced into the reaction tube maintained at 400° C. at a space velocity of 820 hr.$^{-1}$. Over 30 minutes after the starting of reaction, conversion of crotononitrile was 27.6% and one pass yield of methacrylonitrile was 18.7%.

EXAMPLE 18

To an aqueous solution containing 0.01 gram-mole of sodium acetate, 50 g. (=100 ml.) of silica gel was added, and the mixture was evaporated to dryness on a hot water bath. 5 ml. of this catalyst was filled into a reaction tube, and a gas mixture consisting of crotononitrile and nitrogen at a volume ratio of 1:3 was introduced into the reaction tube maintained at 450° C. at a space velocity of 820 hr.$^{-1}$. Over 30 minutes after the starting of reaction, conversion of crotononitrile was 33.5% and one pass yield of methacrylonitrile was 18.5.

EXAMPLE 19

To an aqueous solution containing 0.01 gram-mole of magnesium acetate, 50 g. (=100 ml.) of silica gel was added, and the mixture was evaporated to dryness on a hot water bath. 5 ml. of this catalyst was filled into a reaction tube, and a gas mixture consisting of crotononitrile and nitrogen at a volume ratio of 1:3 was introduced into the reaction tube maintained at 400° C. at a space velocity of 820 hr.$^{-1}$. Over 30 minutes after the starting of reaction, conversion of crotononitrile was 23.2% and one pass yield of methacrylonitrile was 9.6%.

EXAMPLE 20

To an aqueous solution containing 0.01 gram-mole of magnesium nitrate, 50 g. (=100 ml.) of silica gel was added, and the mixture was evaporated to dryness on a hot water bath. 5 ml. of this catalyst was filled into a reaction tube and a gas mixture consisting of crotononitrile and nitrogen at a volume ratio of 1:3 was introduced into the reaction tube maintained 420° C. at a space velocity of 820 hr.$^{-1}$. Over 30 minutes after the starting of reaction, conversion of crotononitrile was 25.8% and one pass yield of methacrylonitrile was 11.3%.

What is claimed is:

1. A process for the molecular rearrangement of a cyano-terminated alkene selected from the group consisting of beta-methylacrylonitrile, beta-ethylacrylonitrile and allylnitrile to produce the corresponding alpha-alkylacrylonitrile selected from the group consisting of alpha-methylacrylonitrile and alpha-ethylacrylonitrile which comprises subjecting said cyano-terminated alkene to an isomerization reaction at a temperature of from 300° C. to 600° C. in the presence of a catalyst selected from the group consisting of oxides, hydroxides, carbonates, nitrates, and acetates of lithium, sodium, potassium, rubidium, cesium, divalent magnesium, trivalent aluminum, combinations of divalent magnesium and one of said above alkali metals, and combinations of trivalent aluminum and one of said above alkali metals.

2. A process according to claim 1, wherein the catalyst further comprises a promoter selected from the group consisting of alkali metal chlorides, alkali metal bromides and alkali metal iodides.

References Cited

UNITED STATES PATENTS

| 2,407,848 | 9/1946 | Ray | 260—465.9 |
| 2,672,477 | 3/1954 | Heinemann | 260—465.9 |
| 2,999,876 | 9/1961 | Roberts et al. | 260—465.9 |

JOSEPH P. BRUST, Primary Examiner